US012664846B2

(12) United States Patent
Chen

(10) Patent No.: US 12,664,846 B2
(45) Date of Patent: Jun. 23, 2026

(54) SYSTEM AND METHOD FOR DETECTING PEOPLE ENTERING AND LEAVING FIELD

(71) Applicant: Quanta Computer Inc., Taoyuan City (TW)

(72) Inventor: Ying-Ru Chen, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 93 days.

(21) Appl. No.: 18/733,301

(22) Filed: Jun. 4, 2024

(65) Prior Publication Data

US 2025/0252798 A1      Aug. 7, 2025

(30) Foreign Application Priority Data

Feb. 2, 2024      (TW) ................................. 113104190

(51) Int. Cl.
    *G07C 9/28*          (2020.01)
    *H04B 17/318*        (2015.01)
    *H04B 17/391*        (2015.01)
(52) U.S. Cl.
    CPC ............. *G07C 9/28* (2020.01); *H04B 17/328* (2023.05); *H04B 17/391* (2015.01)
(58) Field of Classification Search
    None
    See application file for complete search history.

(56) References Cited

U.S. PATENT DOCUMENTS

| | | | | |
|---|---|---|---|---|
| 9,989,633 | B1 * | 6/2018 | Pandey | ...................... G01S 3/32 |
| 11,687,913 | B2 * | 6/2023 | Lee | .................... G06K 7/10306 |
| | | | | 705/44 |
| 11,803,784 | B2 * | 10/2023 | Bergdale | .................. G07C 9/10 |
| 12,328,640 | B2 * | 6/2025 | An | .......................... H04W 4/029 |
| 2016/0358385 | A1 * | 12/2016 | Ziebell | ............... G06K 7/10366 |
| 2020/0166598 | A1 | 5/2020 | Dorn | |
| 2022/0065974 | A1 * | 3/2022 | Ranjbar | .................... G01S 1/08 |

FOREIGN PATENT DOCUMENTS

CN            113359084 A         9/2021

OTHER PUBLICATIONS

Chinese language office action dated Mar. 17, 2025, issued in application No. TW 113104190.

* cited by examiner

*Primary Examiner* — K. Wong
(74) *Attorney, Agent, or Firm* — McClure, Qualey & Rodack, LLP

(57)            ABSTRACT

A method for detecting people entering and leaving a field is provided. The method includes receiving, by a receiver arranged above an entrance, measurement signals transmitted by a transmitter equipped on a person, wherein the receiver has a first receiving antenna and a second receiving antenna, and the first receiving antenna and the second receiving antenna are dual-polarized antennas. The method includes obtaining a signal strength indication (RSSI) of the transmitter and orientation information according to the measurement signals by the receiver, wherein the orientation information includes phase differences of the measurement signals and/or angles of arrival (AoAs) of the transmitter relative to the receiver. The method includes receiving, by a main console, the RSSI and the orientation information from the receiver, and determining whether the person passes through or does not pass through the entrance according to a preset number of RSSIs and the orientation information.

10 Claims, 6 Drawing Sheets

400

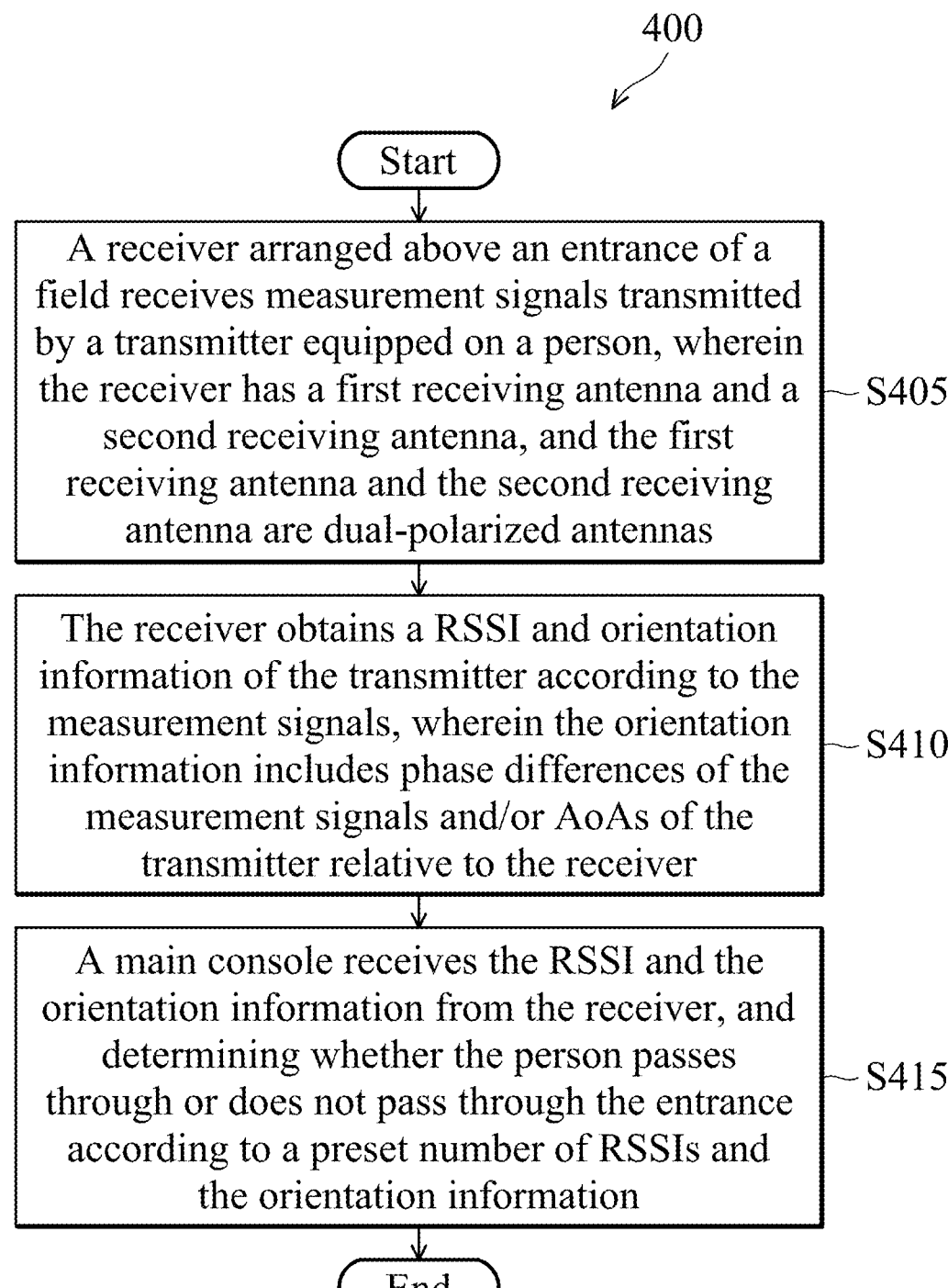

Start

A receiver arranged above an entrance of a field receives measurement signals transmitted by a transmitter equipped on a person, wherein the receiver has a first receiving antenna and a second receiving antenna, and the first receiving antenna and the second receiving antenna are dual-polarized antennas ⌐S405

The receiver obtains a RSSI and orientation information of the transmitter according to the measurement signals, wherein the orientation information includes phase differences of the measurement signals and/or AoAs of the transmitter relative to the receiver ⌐S410

A main console receives the RSSI and the orientation information from the receiver, and determining whether the person passes through or does not pass through the entrance according to a preset number of RSSIs and the orientation information ⌐S415

End

SYSTEM AND METHOD FOR DETECTING PEOPLE ENTERING AND LEAVING FIELD

CROSS REFERENCE TO RELATED APPLICATIONS

This application claims priority of Taiwan Patent Application No. 113104190, filed on Feb. 2, 2024, the entirety of which is incorporated by reference herein.

BACKGROUND OF THE APPLICATION

Field of the Application

The present disclosure generally relates to the field of positioning analysis technologies. More specifically, aspects of the present disclosure relate to a method and device for detecting people entering and leaving a field.

Description of the Related Art

No matter which radio frequency technology (such as Wi-Fi, Bluetooth, iBeacon, Ultra-wideband (UWB), Radio-frequency identification (RFID), etc.) or which wireless signal characteristics (for example, received signal strength indication (RSSI), Time of Arrival (ToA), Time Difference of Arrivals (TDoA), Angle of Arrival) (AoA), Angle of Departure (AoD)) are used in current indoor positioning systems, they have reduced accuracy due to the high complexity of the system or the vulnerability to interference from factors such as multi-path reflections. This may lead to increased system installation and maintenance costs, and also lead to many errors in personnel management and positioning due to inaccuracy.

Therefore, an important issue in this field is how to use a simple system to develop a technology that can more accurately determine when people enter and leave a field.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the method and device for detecting people entering and leaving a field provided in the present disclosure only uses one receiver to accurately determine the moving direction and position of the person, thereby achieving the purpose of reducing hardware construction costs.

In an exemplary embodiment, a method for detecting people entering and leaving a field is provided. The method includes receiving, by a receiver arranged above an entrance of a field, measurement signals transmitted by a transmitter equipped on a person, wherein the receiver has a first receiving antenna and a second receiving antenna, and the first receiving antenna and the second receiving antenna are dual-polarized antennas. The method includes obtaining, by the receiver, a signal strength indication (RSSI) of the transmitter and orientation information according to the measurement signals, wherein the orientation information includes phase differences of the measurement signals and/or angles of arrival (AoAs) of the transmitter relative to the receiver. The method includes receiving, by a main console, the RSSI and the orientation information from the receiver, and determining whether the person passes through or does not pass through the entrance according to a preset number of RSSIs and the orientation information.

In some embodiments, the receiver alternately uses the first receiving antenna and the second receiving antenna in an I/Q (In-phase/Quadrature) sampling mode to receive the measurement signals transmitted by the transmitter.

In some embodiments, the step of determining whether the person passes through or does not pass through the entrance according to the preset number of RSSIs and the orientation information further comprises: obtaining average values of the phase differences and standard deviations of the phase differences of the first receiving antenna and the second receiving antenna based on each phase difference; filtering the standard deviations of the phase differences; obtaining a first weighted average of the phase differences according to the filtered standard deviations of the phase differences; averaging a first number of first weighted averages of the phase differences and the first number of RSSIs to obtain a second weighted average of the phase differences and a RSSI average; and determining whether the person passes through or does not pass through the entrance based on a second number of second weighted averages of the phase differences and the second number of RSSI averages.

In some embodiments, the step of determining whether the person passes through or does not pass through the entrance based on the second number of second weighted averages of the phase differences and the second number of RSSI averages further comprises: determining that the person passes through the entrance of the field when conditions (1) to (3) are all met; wherein condition (1) is that an absolute value of at least one second weighted average of the phase differences among the second number of second weighted averages of the phase differences is less than a first preset value; condition (2) is that the second number of second weighted averages of the phase differences change positively or negatively; and condition (3) is that a maximum value minus a minimum value among the second number of RSSI averages is between a second preset value and a third preset value.

In some embodiments, when the second number of second weighted averages of the phase differences change from positive to negative, the main console determines that the transmitter passes from the field to outside of the field through the entrance; and when the second number of second weighted averages of the phase differences change from negative to positive, the main console determines that the transmitter passes from the outside of the field to the field through the entrance.

In some embodiments, the step of determining whether the person passes through or does not pass through the entrance according to the preset number of RSSIs and the orientation information further comprises: obtaining averages of the AoAs and standard deviations of the AoAs of the first receiving antenna and the second receiving antenna according to each AoA; filtering the standard deviations of the AoAs; obtaining a first weighted average of the AoAs according to the filtered standard deviations of the AoAs; averaging a first number of first weighted averages of the AoAs and the first number of RSSIs to obtain a second weighted averages of the AoAs and a RSSI average; and determining whether the person passes through or does not pass through the entrance based on a second number of second weighted averages of the AoAs and the second number of RSSI averages.

In some embodiments, the step of determining whether the person passes through or does not pass through the entrance based on the second number of second weighted averages of the AoAs and the second number of RSSI averages further comprises: determining that the person passes through the entrance of the field when conditions (1) to (3) are all met; wherein condition (1) is that an absolute value of at least one second weighted average of the AoAs among the second number of second weighted averages of the AoAs is less than a first preset value; condition (2) is that the second number of second weighted averages of the AoAs changes positively or negatively; and condition (3) is that a maximum value minus a minimum value among the second number of RSSI averages is between a second preset value and a third preset value.

In some embodiments, when the second number of second weighted averages of the AoAs change from positive to negative, the main console determines that the transmitter passes from the field to outside of the field through the entrance; and when the second number of second weighted averages of the AoAs changes from negative to positive, the main console determines that the transmitter passes from the outside of the field to the field through the entrance.

In an exemplary embodiment, a device for detecting people entering and leaving a field is provided. The device comprises a receiver arranged above an entrance and a main console coupled to the receiver. The receiver has a first receiving antenna and a second receiving antenna, and the first receiving antenna and the second receiving antenna are dual-polarized antennas. The receiver receives measurement signals transmitted by a transmitter equipped on a person, obtaining a signal strength indication (RSSI) of the transmitter and orientation information according to the measurement signal, wherein the orientation information includes phase differences of the measurement signals and/or angles of arrival (AoAs) of the transmitter relative to the receiver; the main console receives the RSSI and the orientation information from the receiver, and determines whether the person passes through or does not pass through the entrance according to a preset number of RSSIs and the orientation information.

BRIEF DESCRIPTION OF DRAWINGS

The accompanying drawings are included to provide a further understanding of the present disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

FIG. 4 is a flowchart showing a method for detecting people entering and leaving a field according to an embodiment of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of aspects set forth herein. In addition, the scope of the disclosure is intended to cover such an apparatus or method which is practiced using another structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

The embodiments of the present disclosure provide a method and device for detecting people entering and leaving a field. The method and device for detecting people entering and leaving a field only use one receiver to accurately detect the direction of travel of a person wearing a transmitter, thereby effectively reducing the cost of hardware maintenance.

Figure 1:
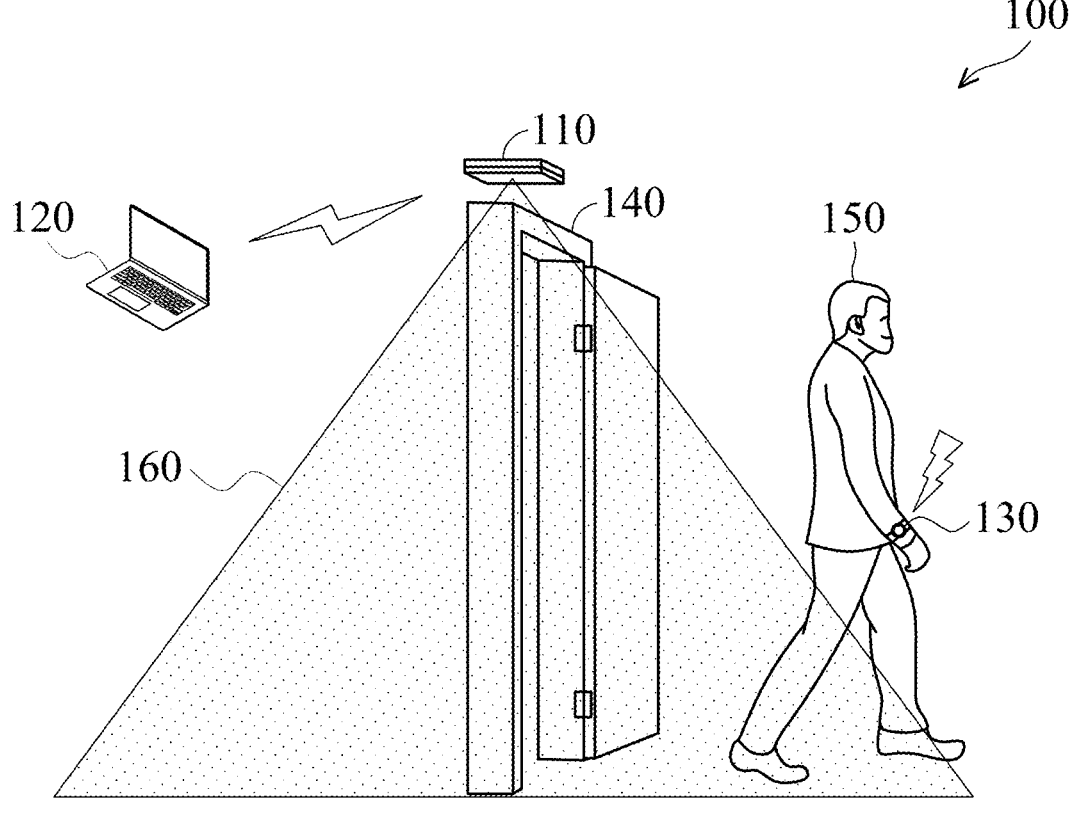
FIG. 1 is a schematic diagram showing a system for detecting people entering and leaving a field according to an embodiment of the present disclosure.

FIG. 1 is a schematic diagram showing a system 100 for detecting people entering and leaving a field according to an embodiment of the present disclosure. In FIG. 1, the system 100 for detecting people entering and leaving a field may be formed by at least a receiver 110 and a main console 120.

The receiver 110 is arranged above an entrance 140 for receiving a measurement signal transmitted by a transmitter 130 equipped on a person 150 in the main sensing area 160. The receiver 110 may obtain a signal strength indication (RSSI) and an angle of arrival (AoA) of the transmitter 130 relative to the receiver 110 according to the measurement signal, and transmits the RSSI and the AoA to the main console 120. In one embodiment, the receiver 110 is an AoA receiver.

The types of the main console 120 range from embedded systems, small handheld devices (e.g., mobile phones/portable computers) to large host systems (e.g., mainframe computers). Examples of portable computers include personal digital assistants (PDAs), notebook computers, and other devices. The main console 120 may be connected to the receiver 110 through a bus or a network. The network may be any type of network familiar to those skilled in the art, and it may use any of various available communication protocols to support data communication, including but not limited to TCP/IP, etc. For example, the network may be a Local Area Network (LAN), such as an Ethernet network, etc., a virtual network, including but not limited to a Virtual Private Network (VPN), the Internet, wireless networks and/or any combination of these and/or other networks.

The main console 120 receives the RSSI and the orientation information transmitted from the receiver 110, and obtains a position of the person 150 based on the RSSI and the orientation information. The main console 120 then determines whether the person 150 passes through or does not pass through the entrance according to a preset number of RSSIs and the orientation information.

In one embodiment, the receiver 110 and the main console 120 are integrated into one chip, one device, or installed on the same platform.

Figure 2:
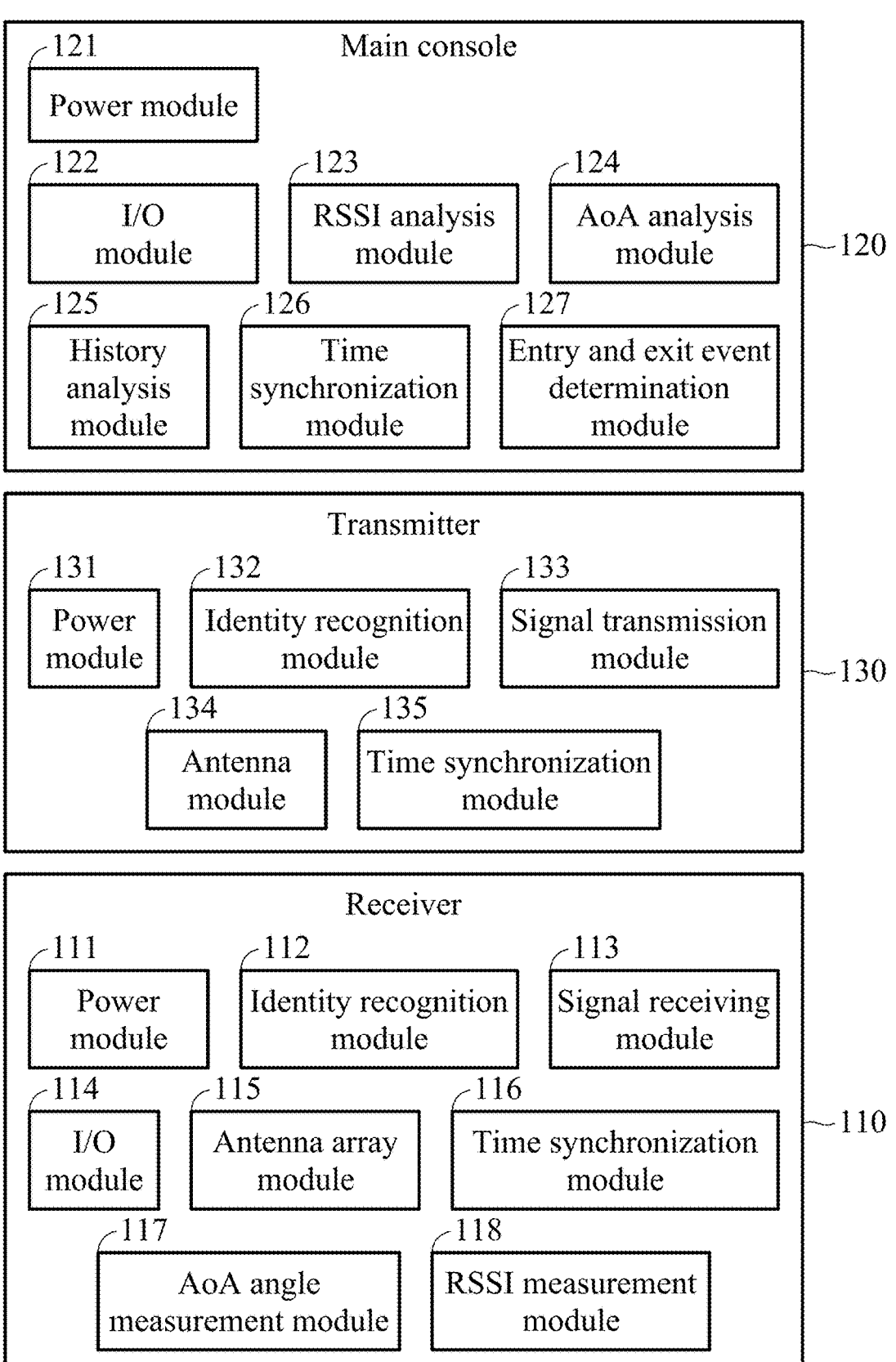
FIG. 2 is a detailed structural diagram showing a receiver, a main console and a transmitter according to an embodiment of the present disclosure.

The receiver 110, the main console 120 and the transmitter 130 are described in more detail below. The detailed architecture of the receiver 110, the main console 120 and the transmitter 130 is shown in FIG. 2.

The main console 120 may comprise a power module 121, an input/output module 122, an RSSI analysis module 123, an AoA analysis module 124, a history analysis module 125, a time synchronization module 126 and an entry and exit event determination module 127.

The power module 121 is used to power the main console 120. The input/output (I/O) module 122 is used to receive and transmit control signals and data between the main console 120 and the receiver 110. In one embodiment, the input/output module 122 may be a wired interface with power supply, such as a Universal Serial Bus (USB) or Power over Ethernet (POE) device, or a wireless interface, such as Wi-Fi or Bluetooth.

The RSSI analysis module 123 may execute an algorithm to analyze the RSSI value and determine the distance between the transmitter 130 and the receiver 110. The AoA analysis module 124 may execute an algorithm to analyze the spatial azimuth angle of the transmitter 130 relative to the receiver 110, that is, the AoA value.

The entry and exit event determination module 127 may execute a determination mechanism or algorithm to determine whether the position of the transmitter 130 has moved based on the RSSI value and the AoA value. The time synchronization module 126 may provide the synchronization time of the system to mark the time when the position of the transmitter 130 moves. The history analysis module 125 records the position of the transmitter 130 determined by the entry and exit event determination module 127 and the time when the position of the transmitter 130 moves marked by the time synchronization module 126, and may also provide other historical query functions.

The transmitter 130 may comprise a power module 131, an identity recognition module 132, a signal transmission module 133, an antenna module 134 and a time synchronization module 135.

The power module 131 is configured to power the transmitter 130. The identity recognition module 132 is configured to record identity recognition information including a unique identification (ID) of the transmitter 130. The identity recognition information may be carried (modulated) in an RF signal and transmitted by the transmitter 130. The antenna module 134 is configured to transmit RF signals. The signal transmission module 133 is configured to modulate the identity recognition information into an RF signal that complies with an AoA specification, wherein the RF signal includes the identity recognition information and a constant tone extension (CTE), and the CTE may vary depending on the position of the transmitter 130, so that the RSSI and AoA angle information obtained by the receiver 110 demodulating the RF signal may vary with the position of the transmitter 130. The time synchronization module 135 is used for time synchronization with the system 100. When the system 100 only needs synchronization between the receiver 110 and the main console 120, the time synchronization module 135 is not needed.

The receiver 110 may comprise a power module 111, an identity recognition module 112, a signal receiving module 113, an input/output (I/O) module 114, an antenna array module 115, a time synchronization module 116, an AoA angle measurement module 117 and an RSSI measurement module 118.

The power module 111 is configured to power the receiver 110. The time synchronization module 116 is configured to synchronize with the time of the main console 120. The antenna array module 115 is configured to receive the RF signal of the transmitter 130 that complies with the AoA specification, wherein the antenna array module 115 has a first receiving antenna and a second receiving antenna, a straight line formed by the first receiving antenna and the second receiving antenna is perpendicular to the entrance, and the first receiving antenna and the second receiving antenna are arranged above the entrance in a downward direction to generate a radio wave path difference of the receiver 110 so as to obtain the AoA angle information. The signal receiving module 113 is configured to demodulate the RF signal. The identity recognition module 112 obtains and recognizes the identity recognition information of the transmitter 130 from the RF signal that has been demodulated by the signal receiving module 113. The RSSI measurement module 118 obtains the RSSI of the RF signal transmitted by the transmitter 130 from the RF signal that has been demodulated by the signal receiving module 113. The AoA angle measurement module 117 obtains the AoA angle information contained in the RF signal transmitted by the transmitter 130 from the RF signal that has been demodulated by the signal receiving module 113. The input/output module 114 transmits the identity recognition information, time information and raw data of the spatial position of the transmitter 130 (including the AoA angle information and the RSSI) to the main console 120. The raw data of the identity recognition information, the time information and the spatial position of the transmitter 130 may be used for the RSSI analysis module 123, the AoA analysis module 124 and the entry and exit event determination module 127 in the main console 120 to determine whether the transmitter 130 has a spatial position transfer event, and are recorded in the history record of the main console 120.

It should be understood that the receiver 110, the main console 120 and the transmitter 130 shown in FIGS. 1 and 2 are examples of the architecture of the system 100 for detecting people entering and leaving a field. Each of the devices shown in FIGS. 1 and 2 may be implemented through any type of electronic device, such as the electronic device 500 described with reference to FIG. 5, for example.

7

Figure 3A:
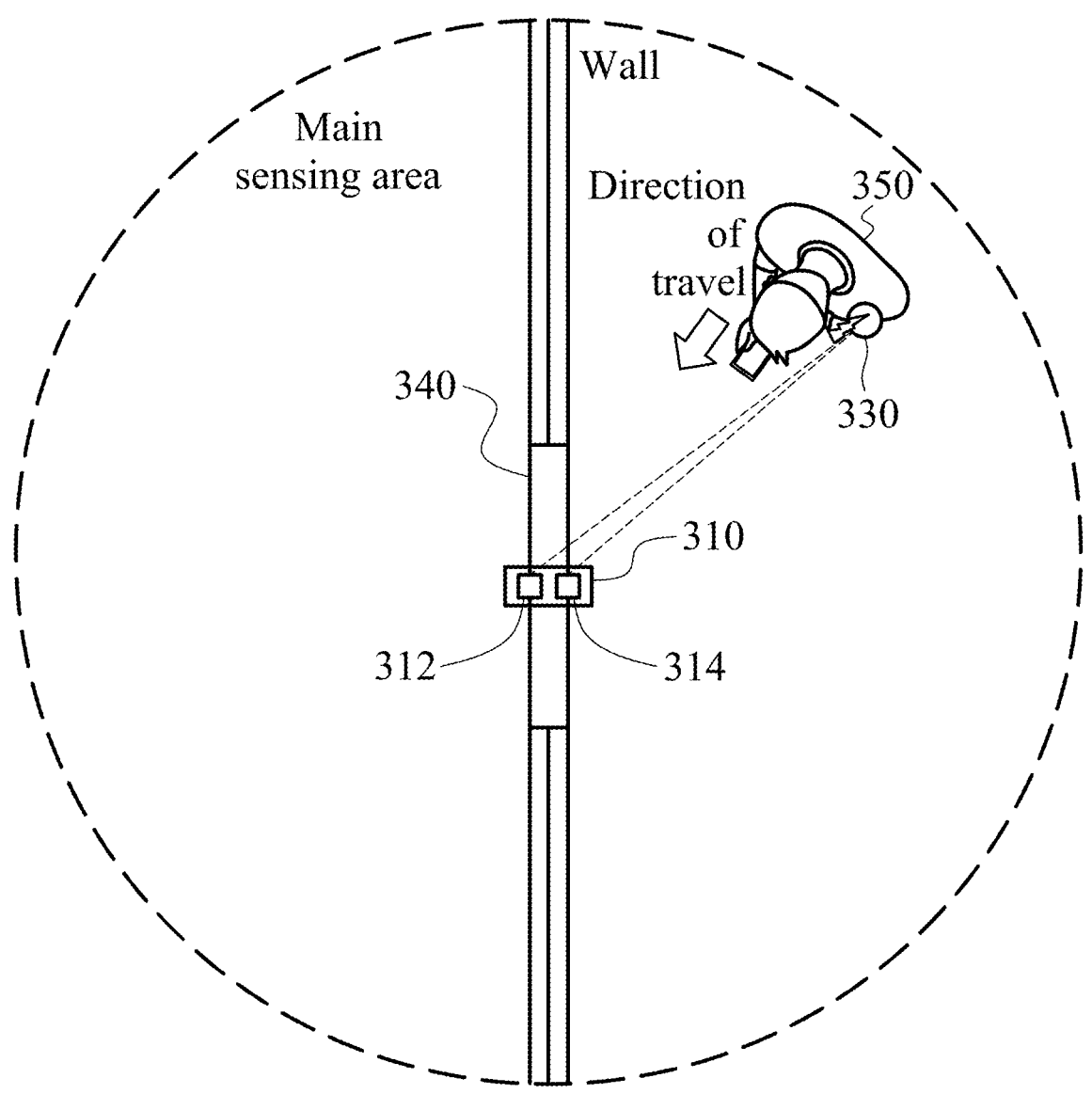
FIG. 3A is a schematic diagram showing AoA estimation according to an embodiment of the present disclosure.
Figure 3B:
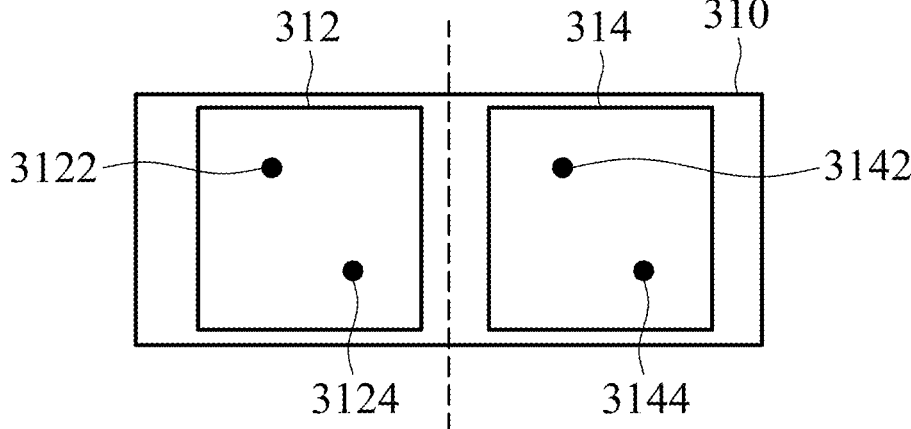
FIG. 3B is a schematic diagram showing the internal structure of the receiver according to an embodiment of the present disclosure.

FIG. 3A is a schematic diagram showing AoA estimation according to an embodiment of the present disclosure. In FIG. 3A, the straight line formed by the first receiving antenna 312 and the second receiving antenna 314 of the receiver 310 is perpendicular to the entrance 340. The first receiving antenna 312 and the second receiving antenna 314 are dual-polarized antennas, wherein the first receiving antenna 312 may include a horizontally polarized antenna 3122 and a vertically polarized antenna 3124, and the second receiving antenna 314 may include a horizontally polarized antenna 3142 and a vertically polarized antenna 3144, as shown in FIG. 3B.

In the In-phase/Quadrature (I/Q) sampling mode, the first receiving antenna 312 and the second receiving antenna 314 continuously switch in a designated switch mode to receive the measurement signals transmitted from the transmitter 330 equipped on a person 350. When one of the receiving antennas is in the sampling period, the received measurement signal remains unchanged. Through switching the I/Q sample values obtained by the two receiving antennas, the receiver may calculate the phase differences, the average of the phase differences and standard deviation of the phase differences of the measurement signals received by the horizontally polarized antenna 3122 and the vertically polarized antenna 3124 of the first receiving antenna 312 and the horizontally polarized antenna 3142 and the vertically polarized antenna 3144 of the second receiving antenna 314. The receiver 310 may obtain the AoA of the transmitter 330 relative to the receiver 310 based on the phase difference of any measurement signal received by different receiving antennas.

FIG. 4 is a flowchart 400 showing a method for detecting people entering and leaving a field according to an embodiment of the present disclosure. This flowchart 400 is executed by the system 100 for detecting people entering and leaving a field in FIGS. 1 and 2.

In step S405, a receiver arranged above an entrance of a field receives measurement signals transmitted by a transmitter equipped on a person, wherein the receiver has a first receiving antenna and a second receiving antenna, a straight line formed by the first receiving antenna and the second receiving antenna is perpendicular to the entrance, and the first receiving antenna and the second receiving antenna are arranged above the entrance in a downward direction. In one embodiment, the first receiving antenna and the second receiving antenna are dual-polarized antennas.

In step S410, the receiver obtains a signal strength indication (RSSI) and orientation information of the transmitter according to the measurement signals, wherein the orientation information includes phase differences of the measurement signals and/or angles of arrival (AoAs) of the transmitter relative to the receiver.

In step S415, a main console receives the RSSI and the orientation information from the receiver, and determining whether the person passes through or does not pass through the entrance according to a preset number of RSSIs and the orientation information.

Specifically, when the orientation information received by the main console includes the phase differences of the measurement signals, the main console may obtain an average of the phase differences and a standard deviation of the phase differences of the horizontally polarized antenna and the vertically polarized antenna in the first receiving antenna and the horizontally polarized antenna and the vertically polarized antenna in the second receiving antenna.

For example, as shown in FIG. 3B, the first receiving antenna 312 includes a horizontally polarized antenna 3122 and a vertically polarized antenna 3124, and the second receiving antenna 314 includes a horizontally polarized antenna 3142 and a vertically polarized antenna 3144. The receiver may receive measurement signals through different polarized antennas according to a preset switching sequence. It is assumed that the switching sequence is a cyclic sequence of the horizontally polarized antenna 3122, the vertically polarized antenna 3124, the horizontally polarized antenna 3142 and the vertically polarized antenna 3144. When the measurement signal 1 is received through the horizontally polarized antenna 3122 in the current time slot, the measurement signal 2 is received through the vertically polarized antenna 3124 in the next time slot, and so on. After the first receiving antenna 312 and the second receiving antenna 314 receive the measurement signals, the receiver 310 may obtain the corresponding I/Q data according to the measurement signals to determine the phase differences of the transmitter relative to the receiver, wherein I means in-phase, Q means quadrature. The main console then obtains the averages of the phase differences and the standard deviations of the phase differences of the horizontally polarized antenna and the vertically polarized antenna in the first receiving antenna and the horizontally polarized antenna and the vertically polarized antenna in the second receiving antenna based on each phase difference transmitted by the receiver.

Then, the main console filters the standard deviations of the phase differences. A high standard deviation of the phase differences indicates poor quality of the measurement signals, and a low standard deviation of the phase differences indicates good quality of the measurement signals. When a standard deviation of phase differences of the horizontally polarized antenna and the vertically polarized antenna is greater than a value (for example, 20), the standard deviation of phase differences corresponding to the horizontally polarized antenna and the vertically polarized antenna may not be used. In other words, the main console filters out the measurement signals with poor quality and retains the measurement signals with better quality.

The main console gives weights corresponding to the averages of the phase differences of the horizontally polarized antenna and the vertically polarized antenna according to the filtered standard deviations of the phase differences to obtain a first weighted average of the phase differences. The formula for the first weighted average of the phase differences is as follows:

$$\frac{V_{Avg} \times H_{Dev}}{V_{Dev} + H_{Dev}} + \frac{H_{Avg} \times V_{Dev}}{V_{Dev} + H_{Dev}}$$

wherein $H_{Avg}$ and $V_{Avg}$ are the averages of the phase differences of the horizontally polarized antenna and the vertically polarized antenna, respectively, and $H_{Dev}$ and $V_{Dev}$ are the filtered deviations of the phase differences of the horizontally polarized antenna and the vertically polarized antenna, respectively.

The main console averages a first number of first weighted averages of the phase differences and the first number of RSSIs to obtain a second weighted average of the phase differences and a RSSI average. In one embodiment, the first number is 6. For example, the main console obtains corresponding 6 first weighted averages of the phase differences and the 6 RSSIs based on 6 filtered measurement signals, and averages the 6 first weighted averages of the phase differences and the 6 RSSIs to obtain a second weighted average of the phase differences and a RSSI average.

The main console determines whether the person passes through or does not pass through the entrance based on a second number of second weighted averages of the phase differences and the second number of RSSI averages. In one embodiment, the second number is 9. In some embodiments, a first-in-first-out (FIFO) data queue management structure may be used to manage the second number of second weighted averages of the phase differences and the second number of RSSI averages. For example, for the first time, the main console sequentially obtains the first to ninth of the second weighted averages of the phase differences and the RSSI averages, and for the second time, the main console sequentially obtains the second to tenth of the second weighted averages of the phase differences and the RSSI averages, and so on.

Specifically, the main console determines whether the conditions (1) to (3) are met, wherein condition (1) is that an absolute value of at least one second weighted average of the phase differences among the second number of second weighted averages of the phase differences is less than a first preset value (for example, the first preset value is 15); condition (2) is that the second number of second weighted averages of the phase differences change positively or negatively; and condition (3) is that a maximum value minus a minimum value among the second number of RSSI averages is between a second preset value and a third preset value (for example, the second preset value is 10, and the third preset value is 30). When the conditions (1) to (3) are all met, the main console determines that the person passes through the entrance.

In condition (2), it is assumed that when more than half of the second weighted averages of the phase differences are greater than the fourth preset value (for example, the fourth preset value is 10), the main console determines that the second number of second weighted averages of the phase differences is positive; on the contrary, when more than half of the second weighted averages of the phase differences are less than the fifth preset value (for example, the fifth preset value is −10), the main console determines that the second number of second weighted averages of the phase differences is negative. When not more than half of the second weighted averages of the phase differences are greater than the fourth preset value or not more than half of the second weighted averages of the phase differences are less than the fifth preset value, the main console determines whether the second number of second weighted averages of the phase differences is positive or negative based on the previous determination result. For example, when the previous determination result is positive, the main console determines that the second number of second weighted averages of the phase differences is positive. When the previous determination result is negative, the main console determines that the second number of second weighted averages of the phase differences is negative. The main console continuously monitors the second number of second weighted averages of the phase differences. When the second number of second weighted averages of the phase differences change from positive to negative, the main console determines that the transmitter passes from the field to outside of the field through the entrance. When the second number of second weighted averages of the phase differences change from negative to positive, the main console determines that the transmitter passes from the outside of the field to the field through the entrance.

In another embodiment, when the orientation information received by the main console includes the AoA, the main console may obtain averages of the AoAs and standard deviations of the AoAs of the horizontally polarized antenna and the vertical polarized antenna in the first receiving antenna and the horizontally polarized antenna and the vertical polarized antenna in the second receiving antenna according to each AoA transmitted by the receiver. The mean value of the angle of arrival and the standard deviation of the angle of arrival of the horizontally polarized antenna and the vertically polarized antenna among the polarized antenna and the second receiving antenna.

Then, the main console filters the standard deviations of the AoAs. A high standard deviation of the AoAs indicates poor quality of the measurement signals, and a low standard deviation of the AoAs indicates good quality of the measurement signals. When a standard deviation of the AoAs of the horizontally polarized antenna and the vertically polarized antenna is greater than a value (for example, 15), the standard deviation of the AoAs corresponding to the horizontally polarized antenna and the vertically polarized antenna may not be used. In other words, the main console filters out the measurement signals with poor quality and retains the measurement signals with better quality.

The main console gives weights corresponding to the averages of the AoAs of the horizontally polarized antenna and the vertically polarized antenna according to the filtered standard deviations of the AoAs to obtain a first weighted average of the AoAs. The formula for the first weighted average of the AoAs is as follows:

$$\frac{V_{Avg} \times H_{Dev}}{V_{Dev} + H_{Dev}} + \frac{H_{Avg} \times V_{Dev}}{V_{Dev} + H_{Dev}}$$

wherein $H_{Avg}$ and $V_{Avg}$ are the averages of the AoAs of the horizontally polarized antenna and the vertically polarized antenna, respectively, and $H_{Dev}$ and $V_{Dev}$ are the filtered standard deviations of the AoAs of the horizontally polarized antenna and the vertically polarized antenna, respectively.

The main console averages a first number of first weighted averages of the AoAs and the first number of RSSIs to obtain a second weighted average of the AoAs and a RSSI average. In one embodiment, the first number is 6. For example, the main console obtains corresponding 6 first weighted averages of the AoAs and the 6 RSSIs based on 6 filtered measurement signals, and averages the 6 first weighted averages of the AoAs and the 6 RSSIs to obtain a second weighted average of the AoAs and a RSSI average.

The main console determines whether the person passes through or does not pass through the entrance based on a second number of second weighted averages of the AoAs and the second number of RSSI averages. In one embodiment, the second number is 9. In some embodiments, a first-in-first-out (FIFO) data queue management structure may be used to manage the second number of second weighted averages of the AoAs and the second number of RSSI averages. For example, for the first time, the main console sequentially obtains the first to ninth of the second weighted averages of the AoAs and the RSSI averages, and for the second time, the main console sequentially obtains the second to tenth of the second weighted averages of the AoAs and the RSSI averages, and so on.

Specifically, the main console determines whether the conditions (1) to (3) are met, wherein condition (1) is that an absolute value of at least one second weighted average of the AoAs among the second number of second weighted averages of the AoAs is less than a first preset value (for example, the first preset value is 15); condition (2) is that the second number of second weighted averages of the AoAs changes positively or negatively; and condition (3) is that a maximum value minus a minimum value among the second number of RSSI averages is between a second preset value and a third preset value (for example, the second preset value is 10, and the third preset value is 30). When the conditions (1) to (3) are all met, the main console determines that the person passes through the entrance.

In condition (2), it is assumed that when more than half of the second weighted averages of the AoAs are greater than the fourth preset value (for example, the fourth preset value is 10), the main console determines that the second number of second weighted averages of the AoAs is positive; on the contrary, when more than half of the second weighted averages of the AoAs are less than the fifth preset value (for example, the fifth preset value is −10), the main console determines that the second number of second weighted averages of the AoAs is negative. When not more than half of the second weighted averages of the AoAs are greater than the fourth preset value or not more than half of the second weighted averages of the AoAs are less than the fifth preset value, the main console determines whether the second number of second weighted averages of the AoAs is positive or negative based on the previous determination result. For example, when the previous determination result is positive, the main console determines that the second number of second weighted averages of the AoAs is positive. When the previous determination result is negative, the main console determines that the second number of second weighted averages of the AoAs is negative. The main console continuously monitors the second number of second weighted averages of the AoAs. When the second number of second weighted averages of the AoAs changes from positive to negative, the main console determines that the transmitter passes from the field to outside of the field through the entrance. When the second number of second weighted averages of the AoAs changes from negative to positive, the main console determines that the transmitter passes from the outside of the field to the field through the entrance.

As mentioned above, the method and system for detecting people entering and leaving a field proposed in the present disclosure only require one receiver to accurately determine the moving direction and the position of the person, thereby achieving the purpose of reducing hardware construction costs.

It should be noted that the embodiment in FIG. 2 can be implemented in hardware, software, firmware or any combination thereof. For example, all modules in the main console 120, the transmitter 130, and the receiver 110 may each be implemented as computer program codes executed by one or more processors. Alternatively, all modules in the main console 120, the transmitter 130 and the receiver 110 may be implemented as hardware logic/circuit respectively.

Figure 5:
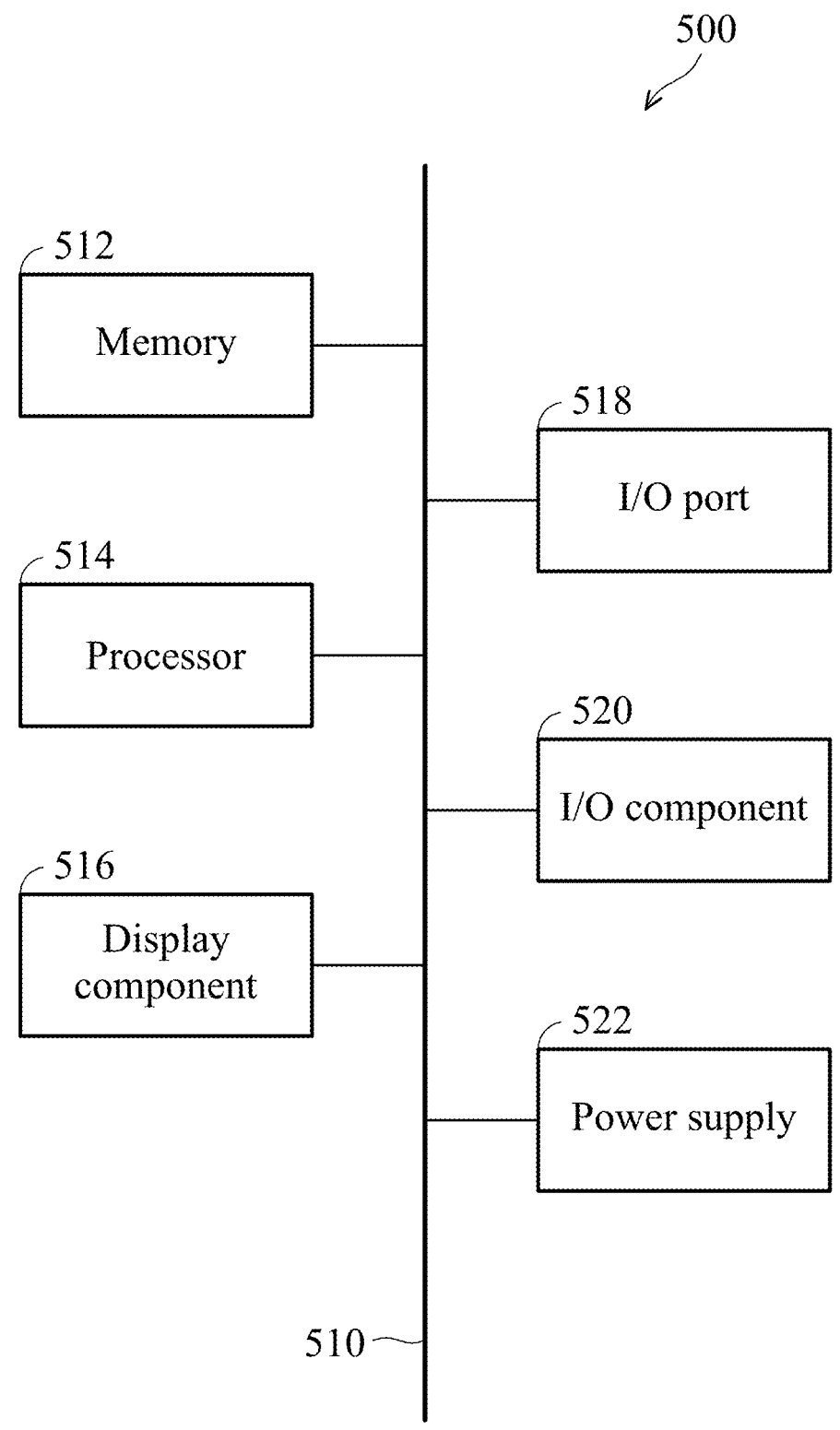
FIG. 5 illustrates an exemplary operating environment for implementing embodiments of the present disclosure.

The embodiments described herein, including systems, methods/processes and/or devices, can be implemented using known servers/computers (such as the electronic device 500 shown in FIG. 5). For example, the main console 120, the transmitter 130, and the receiver 110 may be implemented using one or more electronic devices 500. For purposes of illustration, the electronic device 500 is described below.

Having described embodiments of the present disclosure, an exemplary operating environment in which embodiments of the present disclosure may be implemented is described below. Referring to FIG. 5, an exemplary operating environment for implementing embodiments of the present disclosure is shown and generally known as an electronic device 500. The electronic device 500 is merely an example of a suitable computing environment and is not intended to limit the scope of use or functionality of the disclosure. Neither should the electronic device 500 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 5, the electronic device 500 may include a bus 510 that is directly or indirectly coupled to the following devices: one or more memories 512, one or more processors 514, one or more display components 516, one or more input/output (I/O) ports 518, one or more input/output components 520, and an illustrative power supply 522. The bus 510 may represent one or more kinds of busses (such as an address bus, data bus, or any combination thereof). Although the various blocks of FIG. 5 are shown with lines for the sake of clarity, and in reality, the boundaries of the various components are not specific. For example, the display component such as a display device may be considered an I/O component and the processor may include a memory.

The electronic device 500 typically includes a variety of computer-readable media. The computer-readable media can be any available media that can be accessed by electronic device 500 and includes both volatile and nonvolatile media, removable and non-removable media. By way of example, not limitation, computer-readable media may comprise computer storage media and communication media. The computer storage media may include volatile and non-volatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the electronic device 500. The computer storage media may not comprise signals per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 512 may include computer-storage media in the form of volatile and/or nonvolatile memory. The memory may be removable, non-removable, or a combination thereof. Exemplary hardware devices include solid-state memory, hard drives, optical-disc drives, etc. The electronic device 500 includes one or more processors that read data from various entities such as the memory 512 or the I/O components 520. The display component(s) 516 present data indications to a user or to another device. Exemplary presentation components include a display device, speaker, printing component, vibrating component, etc.

The I/O ports 518 allow the electronic device 500 to be logically coupled to other devices including the I/O components 520, some of which may be embedded. Illustrative components include a microphone, joystick, game pad, satellite dish, scanner, printer, wireless device, etc. The I/O components 520 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, facial recognition, biometric recognition, gesture recognition both on screen and adjacent to the screen, air gestures, head and eye tracking, touch recognition associated with displays on the electronic device 500, or any combination thereof. The electronic device 500 may be equipped with depth cameras, such as stereoscopic camera systems, infrared camera systems, RGB camera systems, or any combination thereof, to realize gesture detection and recognition. Furthermore, the electronic device 500 may be equipped with accelerometers or gyroscopes that enable detection of motion. The output of the accelerometers or gyroscopes may be provided to the display of the electronic device 500 to carry out immersive augmented reality or virtual reality.

Furthermore, the processor 514 in the electronic device 500 can execute the program code in the memory 512 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for detecting people entering and leaving a field, comprising:
   receiving, by a receiver arranged above an entrance of a field, measurement signals transmitted by a transmitter equipped on a person, wherein the receiver has a first receiving antenna and a second receiving antenna, and the first receiving antenna and the second receiving antenna are dual-polarized antennas;
   obtaining, by the receiver, a signal strength indication (RSSI) of the transmitter and orientation information according to the measurement signals, wherein the orientation information includes phase differences of the measurement signals and/or angles of arrival (AoAs) of the transmitter relative to the receiver; and
   receiving, by a main console, the RSSI and the orientation information from the receiver, and determining whether the person passes through or does not pass through the entrance according to a preset number of RSSIs and the orientation information.

2. The method for detecting people entering and leaving a field as claimed in claim 1, wherein the receiver alternately uses the first receiving antenna and the second receiving antenna in an I/Q (In-phase/Quadrature) sampling mode to receive the measurement signals transmitted by the transmitter.

3. The method for detecting people entering and leaving a field as claimed in claim 1, wherein the step of determining whether the person passes through or does not pass through the entrance according to the preset number of RSSIs and the orientation information further comprises:
   obtaining average values of the phase difference and standard deviations of the phase differences of the first receiving antenna and the second receiving antenna based on each phase difference;
   filtering the standard deviations of the phase differences;
   obtaining a first weighted average of the phase differences according to the filtered standard deviations of the phase differences;
   averaging a first number of first weighted averages of the phase differences and the first number of RSSIs to obtain a second weighted average of the phase differences and a RSSI average; and
   determining whether the person passes through or does not pass through the entrance based on a second number of second weighted averages of the phase differences and the second number of RSSI averages.

4. The method for detecting people entering and leaving a field as claimed in claim 3, wherein the step of determining whether the person passes through or does not pass through the entrance based on the second number of second weighted averages of the phase differences and the second number of RSSI averages further comprises:
   determining that the person passes through the entrance of the field when conditions (1) to (3) are all met;
   wherein condition (1) is that an absolute value of at least one second weighted average of the phase differences among the second number of second weighted averages of the phase differences is less than a first preset value;

condition (2) is that the second number of second weighted averages of the phase differences change positively or negatively; and condition (3) is that a maximum value minus a minimum value among the second number of RSSI averages is between a second preset value and a third preset value.

5. The method for detecting people entering and leaving a field as claimed in claim 4, wherein when the second number of second weighted averages of the phase differences change from positive to negative, the main console determines that the transmitter passes from the field to outside of the field through the entrance; and when the second number of second weighted averages of the phase differences change from negative to positive, the main console determines that the transmitter passes from the outside of the field to the field through the entrance.

6. The method for detecting people entering and leaving a field as claimed in claim 1, wherein the step of determining whether the person passes through or does not pass through the entrance according to the preset number of RSSIs and the orientation information further comprises:

obtaining averages of the AoAs and standard deviations of the AoAs of the first receiving antenna and the second receiving antenna according to each AoA;

filtering the standard deviations of the AoAs;

obtaining a first weighted average of the AoAs according to the filtered standard deviations of the AoAs;

averaging a first number of first weighted averages of the AoAs and the first number of RSSIs to obtain a second weighted averages of the AoAs and a RSSI average; and determining whether the person passes through or does not pass through the entrance based on a second number of second weighted averages of the AoAs and the second number of RSSI averages.

7. The method for detecting people entering and leaving a field as claimed in claim 6, wherein the step of determining whether the person passes through or does not pass through the entrance based on the second number of second weighted averages of the AoAs and the second number of RSSI averages further comprises:

determining that the person passes through the entrance of the field when conditions (1) to (3) are all met;

wherein condition (1) is that an absolute value of at least one second weighted average of the AoAs among the second number of second weighted averages of the AoAs is less than a first preset value;

condition (2) is that the second number of second weighted averages of the AoAs changes positively or negatively; and condition (3) is that a maximum value minus a minimum value among the second number of RSSI averages is between a second preset value and a third preset value.

8. The method for detecting people entering and leaving a field as claimed in claim 7, wherein when the second number of second weighted averages of the AoAs changes from positive to negative, the main console determines that the transmitter passes from the field to outside of the field through the entrance; and when the second number of second weighted averages of the AoAs changes from negative to positive, the main console determines that the transmitter passes from the outside of the field to the field through the entrance.

9. A system for detecting people entering and leaving a field, comprising:

a receiver, arranged above an entrance, wherein the receiver has a first receiving antenna and a second receiving antenna, and the first receiving antenna and the second receiving antenna are dual-polarized antennas; and a main console, coupled to the receiver;

wherein the receiver receives measurement signals transmitted by a transmitter equipped on a person, obtaining a signal strength indication (RSSI) of the transmitter and orientation information according to the measurement signal, wherein the orientation information includes phase differences of the measurement signals and/or angles of arrival (AoAs) of the transmitter relative to the receiver; the main console receives the RSSI and the orientation information from the receiver, and determines whether the person passes through or does not pass through the entrance according to a preset number of RSSIs and the orientation information.

10. The system for detecting people entering and leaving a field as claimed in claim 9, wherein the receiver alternately uses the first receiving antenna and the second receiving antenna in an I/Q (In-phase/Quadrature) sampling mode to receive the measurement signals transmitted by the transmitter.

* * * * *